US011321888B2

(12) United States Patent
Sharafi et al.

(10) Patent No.: US 11,321,888 B2
(45) Date of Patent: May 3, 2022

(54) DYNAMIC VIRTUAL ELEMENT POSITIONING IN AN AUGMENTED REALITY ENVIRONMENT

(71) Applicant: Comcast Cable Communications, LLC, Philadelphia, PA (US)

(72) Inventors: Kalila Sharafi, Philadelphia, PA (US); Ryan Duffy, Morrisville, PA (US); Stefan Backhaus, Philadelphia, PA (US); Sabina Fletcher, Sewell, NJ (US); Heather Hollis, Ardmore, PA (US); Christopher Follett, Kentfield, CA (US); Eric Campdoras, Mill Valley, CA (US); Stephan Lough, Los Angeles, CA (US); Sarbari Tina Biswas, Princeton Junction, NJ (US); Emily Bluedorn, Dallas, TX (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 236 days.

(21) Appl. No.: 16/819,848

(22) Filed: Mar. 16, 2020

(65) Prior Publication Data
US 2021/0287410 A1 Sep. 16, 2021

(51) Int. Cl.
*H04N 5/232* (2006.01)
*H04M 1/72454* (2021.01)
*G06T 11/60* (2006.01)

(52) U.S. Cl.
CPC .......... *G06T 11/60* (2013.01); *H04M 1/72454* (2021.01); *H04N 5/232127* (2018.08); *G06T 2200/24* (2013.01); *H04M 2250/52* (2013.01)

(58) Field of Classification Search
None
See application file for complete search history.

(56) References Cited

U.S. PATENT DOCUMENTS

| | | | |
|---|---|---|---|
| 2010/0149310 A1* | 6/2010 | Zhang | H04N 7/15 348/14.16 |
| 2018/0095616 A1* | 4/2018 | Valdivia | G06F 3/013 |
| 2018/0173980 A1* | 6/2018 | Fan | G06K 9/2027 |

* cited by examiner

*Primary Examiner* — Kyle Zhai
(74) *Attorney, Agent, or Firm* — BakerHostetler

(57) ABSTRACT

Systems, methods, and devices relating to dynamic virtual element positioning in an augmented reality (AR) environment are described herein. In a method, a viewport may be output by a computing device and may comprise a virtual element and at least a portion of a scene captured by a camera associated with the computing device. A movement of the at least a portion of the scene in the viewport may be determined. An offset focal point along at least a portion of an axis of the virtual element may be determined that is the closest to a viewport focal point at the vertical and horizontal center of the viewport. The virtual element may be positioned in the viewport based on the movement of the at least a portion of the scene in the viewport and a distance between the offset focal point and the viewport focal point.

23 Claims, 11 Drawing Sheets

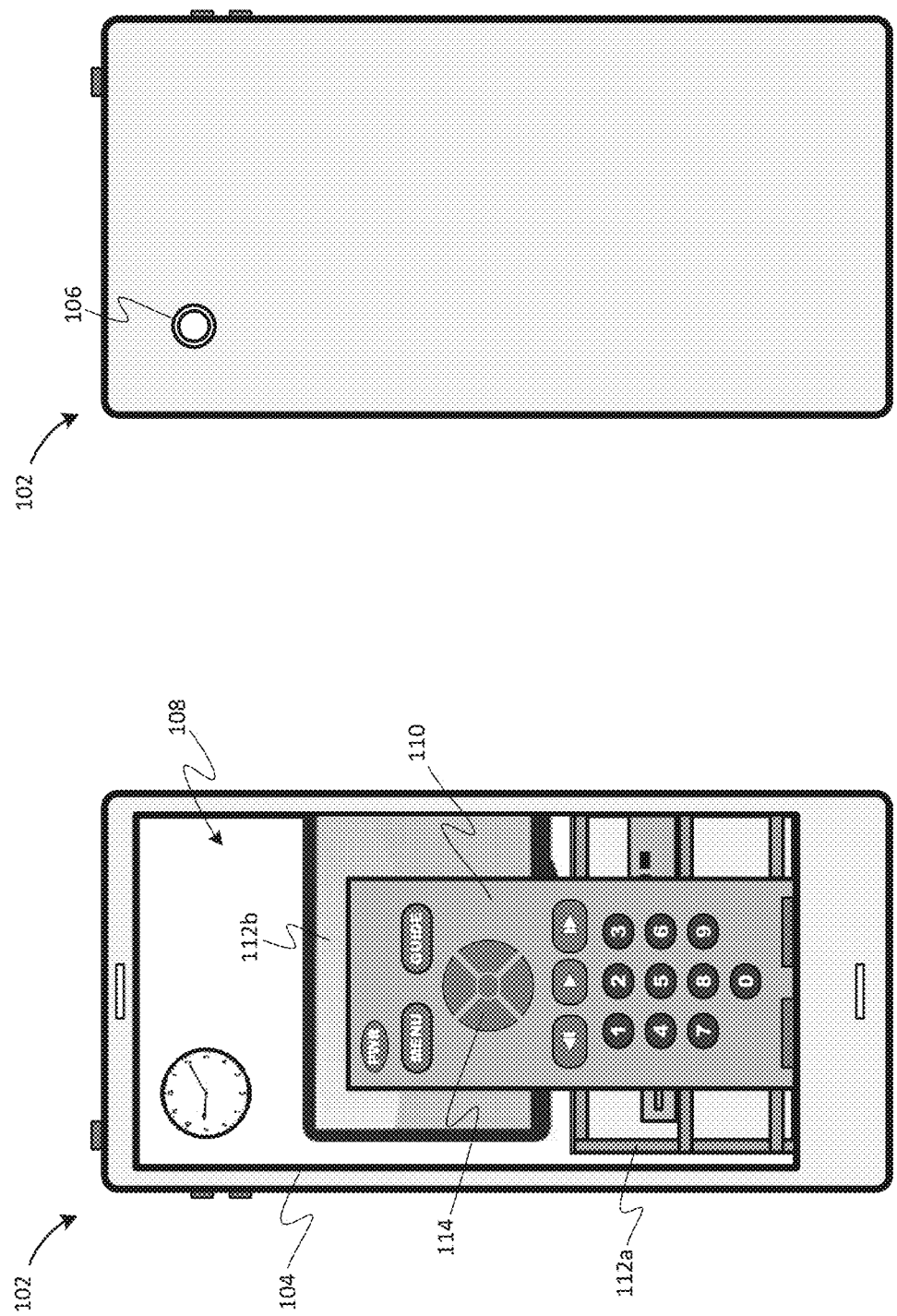

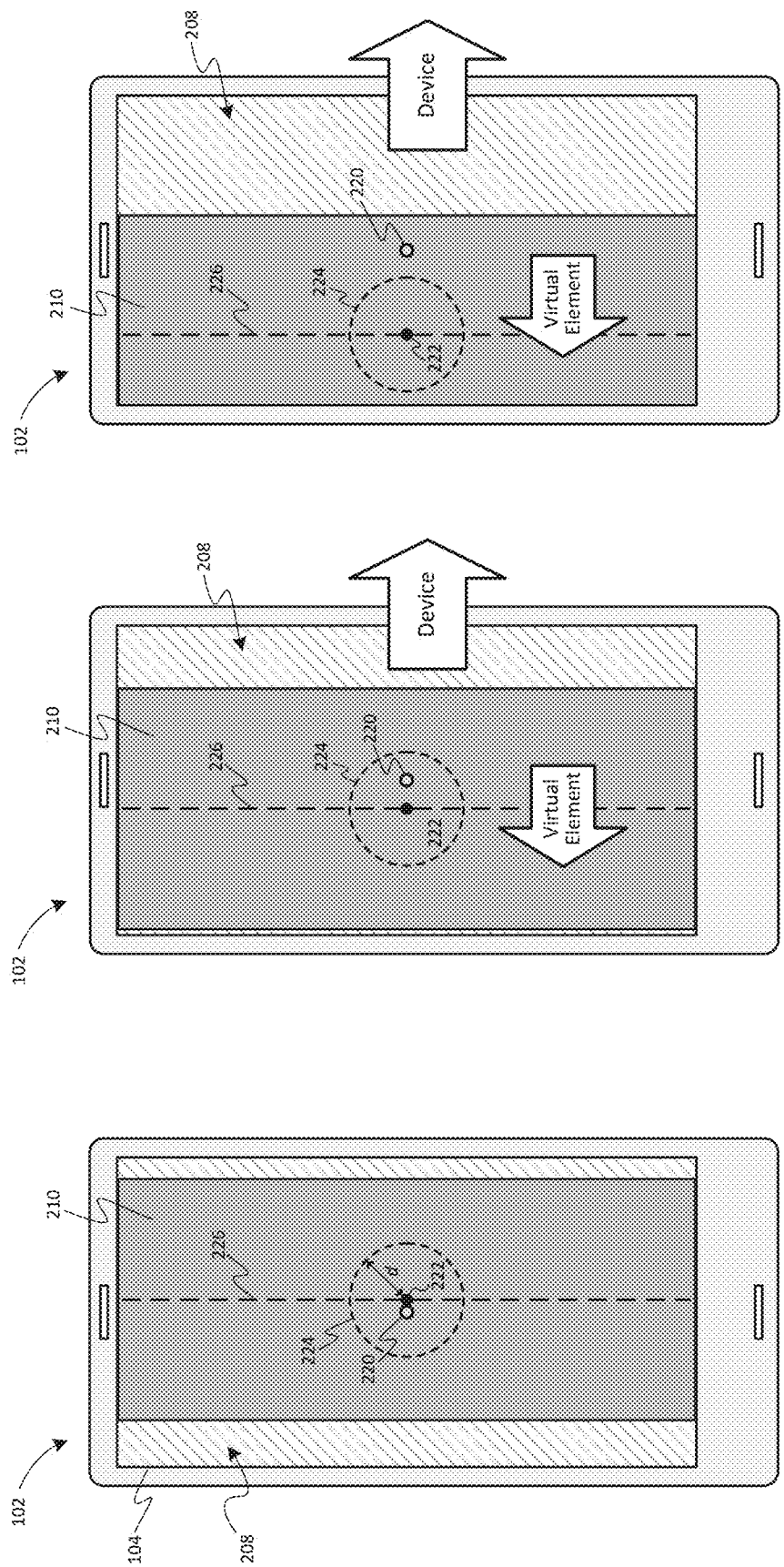

DYNAMIC VIRTUAL ELEMENT POSITIONING IN AN AUGMENTED REALITY ENVIRONMENT

BACKGROUND

In an augmented reality (AR) environment, one or more computer-generated virtual elements may be displayed along with one or more real (i.e., so-called "real world") elements. For example, a real-time image or video of a surrounding environment may be shown on a computer screen display with one or more overlaying virtual elements. Such virtual elements may provide complementary information relating to the environment or generally enhance a user's perception and engagement with the environment. Conversely, the real-time image or video of the surrounding environment may additionally or alternatively enhance a user's engagement with the virtual elements shown on the display. As one example, a mobile device, such as a smart phone, may be used to realize an AR environment. A real-time video of the surrounding real-world environment may be captured by a camera of the mobile device and that video scene may be shown on the mobile device's screen display. Virtual elements associated with the real-world environment may be overlaid on portions of the displayed video. As the user moves and/or changes the direction of the camera, the virtual elements may be modified accordingly. For example, virtual elements may be repositioned, removed, or added. Further, the appearance or content of virtual elements may be adjusted.

Challenges remain in presenting a virtual element in an AR environment in a manner most beneficial to a particular application. For example, a virtual element may be configured to move within a viewport of the AR environment based on movements of the associated camera. User engagement and interaction with the virtual element may be frustrated if the virtual element is allowed to move too far or even completely out of view due to certain movements of the camera. Additional difficulties may arise if movement of the virtual element is indiscriminately limited along all axes of the virtual element, particularly when the virtual element does not have equal vertical and horizontal dimensions.

SUMMARY

Systems, methods, and devices relating to dynamic virtual element positioning in an augmented reality (AR) environment are described.

A method may comprise outputting, by a computing device, a viewport (e.g., an AR viewport) that comprises a virtual element and a least a portion of a scene captured by a camera associated with the computing device. The virtual element may be elongated. The computing device may comprise a smart phone or other mobile device that is configured with said camera, for example. A movement of the scene in the viewport may be determined. Such movement of the scene in the viewport may correspond with movement of the computing device or camera, for example. An offset focal point along at least a portion of an axis (e.g., a longitudinal axis) of the virtual element may be determined. The determined offset focal point may be the point along the at least a portion of the axis that is closest to a viewport focal point of the viewport. The viewport focal point may be at the vertical and horizontal center of the viewport and may correspond to the real-world space directly in front of the camera.

The virtual element may be positioned in the viewport based on the movement of the scene in the viewport and a distance between the offset focal point and the viewport focal point. Movement of the scene in the viewport may cause an opposite movement of the virtual element in the viewport, although such movement of the virtual element may be restricted or subject to corrective movement based on the distance between the offset focal point and the viewport focal point. The method and other techniques described herein may allow a user to more easily view one or more end portions of the virtual element (e.g., the top and/or bottom portions if vertically elongated or the right and/or left portions if horizontally elongated) while the positioning or movement of the virtual element corresponding to its non-elongated dimension may be more strictly limited or corrected.

As an example, the virtual element may move in the viewport from an initial position (e.g., the position prior to the movement of the scene in the viewport) to a second position subsequent to the movement of the scene in the viewport. The second position of the virtual element may be such that the distance between the offset focal point and the viewport focal point is less than or equal to a predetermined distance threshold. The initial position of the virtual element may be such that the offset focal point is less than or equal to the distance threshold or may be such that the offset focal point is greater than the distance threshold. In the former case, for example, the virtual element may be considered as moving from an initial acceptable position relative to the viewport to a second position that is also within acceptable limits relative to the viewport. In the latter case, for example, the virtual element may be considered as moving from an initial position that is beyond acceptable limits relative to the viewport to a second position that is within acceptable limits relative to the viewport. In this latter case, for example, the virtual element or portions thereof may be considered as being initially too far out of the viewport or too near a border of the viewport.

As another example, the position of the virtual element in the viewport may remain constant during the movement of the scene in the viewport. This may occur, for instance, when the distance between the viewport focal point and the offset focal point before the movement of the scene in the viewport may be equal to the distance threshold. That is, the position of the virtual element may be at the cusp of acceptable limits, at least with respect to the movement of the virtual element that may typically result from said movement of the scene in the viewport. Rather than allow a movement of the virtual element that would cause the distance between the offset focal point and the viewport focal point to exceed the distance threshold, the position of the virtual element may be instead held constant over the movement of the scene in the viewport. This may appear to a user as if the virtual element is being pulled along with the scene in the viewport and/or camera as it moves.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF DRAWINGS

The accompanying drawings, which are incorporated in and constitute a part of this specification, illustrate embodiments and together with the description, serve to explain the principles of the systems, methods, and devices:

FIGS. 1A-B are diagrams of an example computing device.

FIGS. 2A-E are diagrams of an example computing device under various stages of movement.

Aspects of the disclosure will now be described in detail with reference to the drawings, wherein like reference numbers refer to like elements throughout, unless specified otherwise.

DETAILED DESCRIPTION

Figures 2D, 2E:
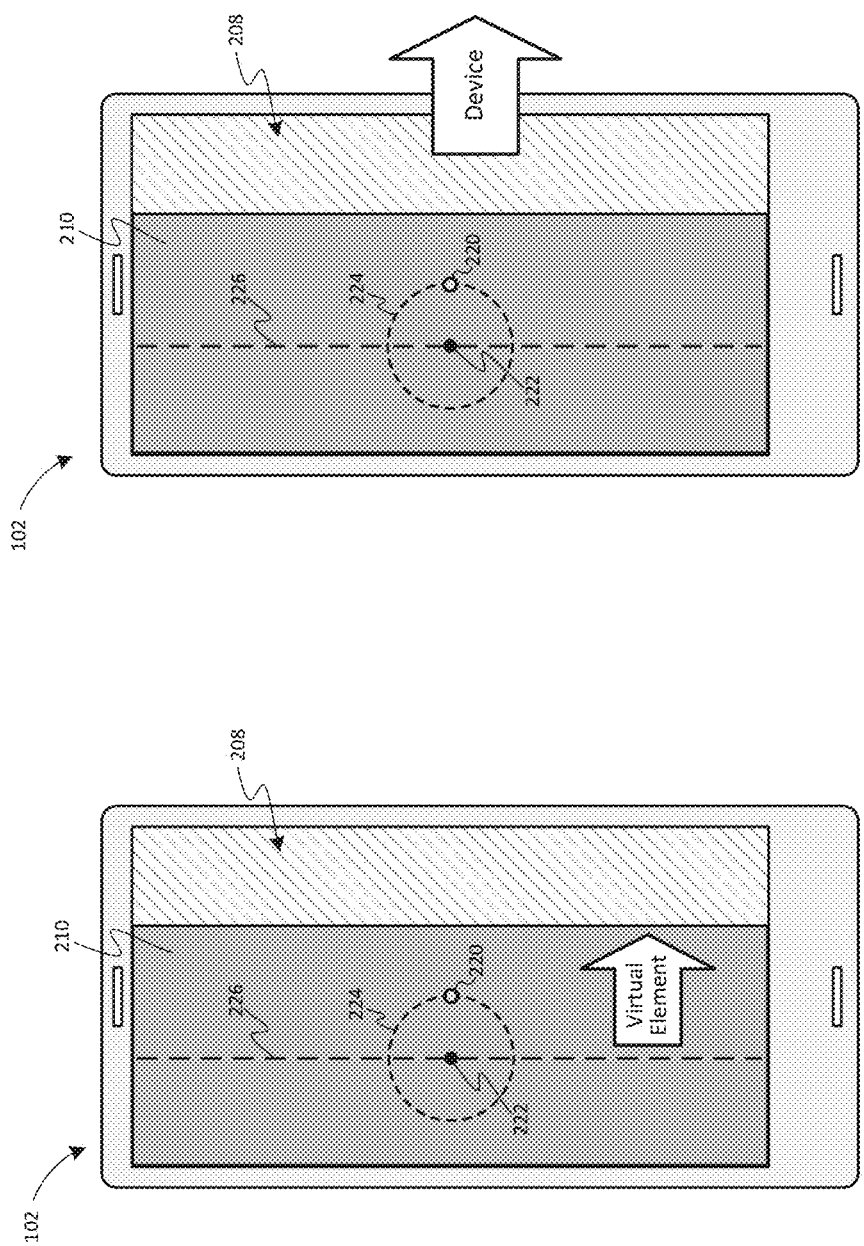

Systems, methods, and devices relating to dynamic virtual element positioning in an augmented reality (AR) environment are described. An AR environment may comprise a viewport with a virtual element that overlays at least a portion of a captured video scene. The viewport may be output by a computing device, such as a smart phone configured with a camera that captures the video scene displayed in the viewport. The virtual element may be elongated, such as a vertically-oriented virtual remote control. Subject to one or more of the various conditions described herein, the device (e.g., the camera associated with the device) may be moved to cause an opposite movement of the virtual element in the viewport. This may result in the visual impression that the virtual element is present in the real-world space captured by the camera. As noted, however, the movement or positioning of the virtual element in the viewport may be restricted or subject to correction if the virtual element is moved or would be moved to a position that is beyond acceptable limits in relation to the viewport (e.g., a focal point at the center of the viewport). According to the techniques described herein, movement of the virtual element corresponding to its elongated dimension may be less restricted than movement of the virtual element corresponding to its non-elongated dimension. This may enable a user to more easily view features of the virtual element at the end portions of the virtual element, such as buttons or other controls at the top or bottom of a virtual remote control.

As an example, the viewport may comprise a vertically-elongated virtual element. An upward movement of the device (which may cause a corresponding upward movement of the scene in the viewport) may typically cause a downward movement of the virtual element in the viewport and vice versa. Similarly, a leftward movement of the device (which may cause a corresponding leftward movement of the scene in the viewport) may typically cause a rightward movement of the virtual element in the viewport and vice versa. Similar concepts same may apply to diagonal movements, as well as zoom-in/zoom-out movements. Based on a determined movement or predicted movement of the device (e.g., movement of the scene in the viewport), an offset focal point along the longitudinal axis of the virtual element may be determined that is closest to the focal point at the center of the viewport. The positioning of the offset focal point on the longitudinal axis of the virtual element may be regarded in some sense as the offset focal point sliding along the longitudinal axis according to the relative position of the viewport focal point.

The virtual element may be positioned or moved based on the movement of the device and the distance between the offset focal point and the viewport focal point. For example, if the offset focal point is too far away from the viewport focal point, the virtual element may be moved so that the position of the offset focal point (and the virtual element generally) is within acceptable limits. As another example, if the position of the offset focal point is within acceptable limits relative to the viewport focal point, the virtual element may move according to the movement of the device if the resulting position of the offset focal point would be within acceptable limits relative to the viewport focal point. Yet if the resulting position of the offset focal point would exceed acceptable limits, the movement of the virtual element may be restricted, at least in part, so that the position of the offset focal point remains within acceptable limits. As another example, if the position of the offset focal point is already at the acceptable limit relative to the viewport focal point, the position of the virtual element may remain constant such that the virtual element may be seen as being pulled along with the movement of the device.

Although described primarily in the context of augmented reality, the disclosed techniques may be similarly applied in a virtual reality environment. For example, the captured video scene shown in the viewport may be replaced by computer-generated elements in a virtual reality environment. These computer-generated elements may be treated functionally in the same manner as if they were a captured video scene. The techniques described herein may be also applied to mixed reality environments and other immersion technologies.

FIGS. 1A and 1B illustrate the front and back, respectively, of a device 102 configured to realize an AR environment. The device 102 is shown here as a smart phone, but may comprise various other types of computing devices. For example, the device 102 may comprise a mobile device, such as the aforementioned smart phone, a tablet computer, or a portable gaming device. The device 102 may comprise a wearable computing device, such as a head-mounted display or smart glasses. The device 102 may comprise a virtual retinal display or a contact lens configured to display computer-generated elements.

The device 102 may comprise a screen display 104 on the device's 102 front and a camera 106 on the device's 102 back. The camera 106 may be configured to capture still images and video images. The device 102 may be additionally or alternatively configured with a camera on its front (not shown). The screen display 104 may comprise an LED or OLED screen display. The screen display 104 may comprise a see-through display. The screen display 104 may comprise a touchscreen configured to receive user inputs. The device 102 may comprise a gyroscope (e.g., a vibrating structure microelectromechanical systems (MEMS) gyroscope), an accelerometer, or other type of movement sensor via which the movement and orientation of the device 102 may be determined.

The screen display 104 may output a viewport 108 configured to display a video scene captured by the camera 106. The viewport 108 may display the video from the camera 106 in real-time or near real-time. The viewport 108 may display video from a video source other than the camera 106, such as an external video source. The viewport 108 shown in FIG. 1A covers the entirety of the screen display 104 (e.g., a full-screen mode), although the disclosure is not so-limited. For example, the viewport 108 may cover only a portion of the screen display 104. The viewport 108 may be shown in a screen, a window, or a user interface of an application executing on the device 102, for example.

The viewport 108 may display one or more virtual elements 110. The virtual element 110 may be computer-generated by the device 102 and overlay, at least in part, the captured video scene, including various real-world objects in the video. For example, the virtual element 110 overlays an entertainment console 112a and a television 112b in the video scene. The virtual element 110 in FIG. 1A is shown as a remote control for a television, set-top box, or other form of video output or display device. The disclosure is not so-limited, however, and the virtual element 110 may comprise any sort of object, real or abstract. The virtual element 110 may be partially transparent, in which case the portions of the video scene overlaid by the virtual element 110 may be partially visible.

The virtual element 110 may be elongated. For example, one dimension of the virtual element 110 may be greater than a second dimension of the virtual element 110 that is perpendicular to the first dimension. The virtual element 110 may be elongated along a longitudinal axis of the virtual element 110. The virtual element 110 may be elongated vertically (e.g., near-vertically) in the viewport 108, as is shown in FIG. 1A. Vertical in this context may refer to the up-down dimension in FIGS. 1A and 1B, as well as in FIGS. 2A-E through FIGS. 5A-D. The device 102, the screen display 104, and the viewport 108, as shown in FIG. 1A, may be considered as vertically elongated as well. The virtual element 110, the device 102, the screen display 104, and/or the viewport 108 may be elongated horizontally or near-horizontally. Horizontal in this context may refer to the side-to-side dimension in FIGS. 1A and 1B, as well as in FIGS. 2A-E through FIGS. 5A-D.

The virtual element 110 may be presented as a two-dimensional object. Or the virtual element 110 may be presented as a three-dimensional object, or with at least some three-dimensional aspects. For example, the virtual element 110 may enlarge or shrink (e.g., zoom in or zoom out) according to movement of the camera 106, such as movement away from the user's body or toward the user's body, respectively (or vice versa depending on the particular configuration).

The virtual element 110 may be used for various informational or educational purposes. For example, the virtual element 110 may provide information relating to the real-world environment and/or objects shown in the viewport 108. For example, the virtual element 110 may display information relating to a real-world object in the viewport 108 that the virtual element 110 overlays or points to. The user may position the device 102 so that the virtual element 110 overlays or points to the object that the user seeks more information on.

Additionally or alternatively, the virtual element 110 may be used to provide information or an educational experience relating to a real-world object represented by the virtual element 110. For example, a user may indicate (e.g., via a touch input) a feature of the virtual element 110 to receive additional information about that feature (e.g., the corresponding feature of a real-world object represented by the virtual element 110). The information may be provided via audio output by the device 102, such as a voice description or explanation of an indicated feature and its functions. The information relating to an indicated feature of the virtual element 110 may also be provided via a video output by the device 102, such as a video providing a demonstration of the feature and associated functions. An animated or computer-generated demonstration of an indicated feature of the virtual element 110 and associated functions may also be shown in the viewport 108. Such animation or computer-generated elements may overlay at least a portion of the captured video scene shown in the viewport 108.

The virtual element movement control techniques described herein may enhance the information or educational experience afforded by the virtual element 110. For example, a user may receive the information or engage in the educational experience relating to the virtual element 110 in the same or similar environment that the user may actually use a real-world analogue of the virtual element 110, thus providing context for this information. For instance, as shown in FIG. 1A, a user may interact with the virtual remote control while in the user's actual viewing environment.

A user may indicate a feature of the virtual element 110 via a touch input to the device 102, such as a touch input to the feature that the user wishes to receive information on. In the virtual remote control shown in FIG. 1A, a user may provide a touch input to a button or formation of buttons of the virtual remote control to receive information on the functions of the button(s) on an analogue real-world remote control.

A feature of the virtual remote control or other type of virtual element 110 may be additionally or alternatively indicated according to the relative positioning of that feature within the viewport 108 (e.g., at the center of the viewport 108). For example, a user may indicate a feature of the virtual element 110 by causing that feature to be positioned at the center (or other designated area) of the viewport 108. In the virtual remote control example shown in FIG. 1A, a user may have positioned the circular formation of buttons 114 at the approximate center of the viewport 108 to indicate that he or she would like additional information relating to the circular formation of buttons 114. The indicated feature of the virtual element 110 may be highlighted (or otherwise visually differentiated from the remainder of the virtual element 110) to reflect that this portion is indeed "indicated." A text element (not shown) in the viewport 108 may additionally or alternatively reflect the indicated feature.

The virtual element 110 may move within the viewport 108 based on movement of the device 102, the camera 106, and/or the scene in the viewport 108. Unless clearly indicated expressly or by context, "movement" as used in this disclosure shall refer to left-right/up-down movements of the device 102, the camera 106, and/or the scene in the viewport 108, towards-and-away movements of the device 102, the camera 106, and/or the scene in the viewport 108, left-right/up-down rotations of the device 102, the camera 106, and/or the scene in the viewport 108, clockwise/counter-clockwise rotations of the device 102, the camera 106, and/or the scene in the viewport 108, or any combination thereof.

As an example, starting at the position shown in FIG. 1A, the virtual element 110 may shift in the viewport 108 in a horizontal direction based on a horizontal movement of the device 102 (and/or the camera 106 and/or the scene in the viewport 108) in the opposite direction. That is, the virtual element 110 may shift to the left based on a rightward movement of the device 102. Or, conversely, the virtual element 110 may shift to the right based on a leftward movement of the device 102. This may simulate or give the visual impression of the virtual element 110 remaining in place in the surrounding real-world environment. Yet, in accordance with the virtual element movement control techniques described herein, if a horizontal movement of the device 102 continues too far in that particular direction, the associated movement of the virtual element 110 in the opposite direction may be restricted or corrected for. For example, rather than moving the virtual element 110 out of the viewport 108 so as to strictly maintain the visual impression that the virtual element 110 remains in place within the real-world environment, the horizontal movement of the virtual element 110 may be limited such that the virtual element 110 remains at least in part (e.g., mostly or completely) within the viewport 108. Once the device 102 is no longer being moved in that particular direction, the virtual element 110 may move back towards a middle position in the viewport 108. In other words, the virtual element 110 may move to "catch up" to the device 102. In this manner, the virtual element 110 may generally remain visible to the user in the viewport 108 while also giving a visual impression that the virtual element 110 exists in the real world. In some aspects, the horizontal location of the virtual element 110 in the viewport 108 may remain fixed regardless of any horizontal movement of the device 102.

Some of the same or similar concepts may be applied to vertical movements of the device 102 in the real-world space and associated vertical movements of the virtual element 110 in the viewport 108. For example, an upward movement of the device 102 (and/or the camera 106 and/or the scene in the viewport 108) may cause the virtual element 110 to shift downward in the viewport 108. Conversely, a downward movement of the device 102 may cause the virtual element 110 to shift upward in the viewport 108. Like with horizontal movements, this may simulate or give the visual impression that the virtual element 110 is actually present in the real-world environment. However, due to the elongated vertical dimensions of the virtual element 110, the methods applied to control the vertical movements of the virtual element 110 may differ in some aspects from those used to control the movements of the virtual element 110 in the horizontal directions.

For example, a user may wish to view features of the virtual element 110 in the virtual element's 110 top portion, such as the MENU button, the GUIDE button, or the circular formation of buttons 114 of the virtual remote control shown in FIG. 1A. The user may thus shift the device 102 upward in the real-world space. In accordance with the virtual element movement control techniques described herein, the virtual element 110 may move correspondingly downward in the viewport 108. The user may continue to move the device 102 upward until the top portion of the virtual element 110 is at the desired position in the viewport 108 (e.g., the approximate center of the viewport 108). Rather than limit the vertical movement of the virtual element 110 so that the virtual element 110 remains mostly or completely in the viewport 108, as may be the case with horizontal movement, a greater portion (e.g., a majority or other predefined proportion) of the virtual element 110 may be allowed to move outside of the viewport 108. Although, the vertical movement of the virtual element 110 may still be restricted if movement of the device 102 would cause the virtual element 110 to move too far (e.g., past a threshold) out of the viewport 108. For example, the vertical movement of the virtual element 110 may be restricted if such movement would cause the virtual element 110 to move completely or almost completely out of the viewport 108.

The virtual element movement control techniques described herein may be accomplished, at least in part, via a dynamic offset focal point for the virtual element 110 that may "slide" along the longitudinal axis of the virtual element 110 when determining the location and movements of the virtual element 110 when the device 102 is moved. An offset focal point for the virtual element 110 may be determined as a point along the longitudinal axis of the virtual element 110 that is closest to the focal point of the viewport 108 (i.e., the center of the viewport 108). This offset focal point on the longitudinal axis of the virtual element 110 may be used as a dynamic point of reference to determine if the virtual element 110 is or will be moved too far, vertically or horizontally, out of the viewport 108. This is in contrast to using a fixed focal point offset for the virtual element 110 that is centered both horizontally and vertically on the virtual element 110, which may prevent the user from viewing and interacting with the desired vertical portions of the virtual element 110 (e.g., the MENU or GUIDE buttons on the virtual remote control shown in FIG. 1A).

FIGS. 2A-E illustrate the device 102 as it undergoes various stages of horizontal movement and any associated horizontal movements of an elongated virtual element 210 in a viewport 208 output by the screen display of the device 102. It will be noted that while FIGS. 2A-E (as well as FIGS. 3A-E, 4A-E, and 5A-D) are described primarily in terms of movements of the device 102, the same or similar concepts may be applied when movements of the scene in the viewport 208 are considered as the bases (at least in part) for the virtual element movement control instead of or in addition to the movements of the device 102. For example, movement of the device 102 in a particular direction may cause a corresponding movement of the scene in the viewport 208. Referring back to FIG. 1A as an example, a rightward movement of the device 102 may cause a corresponding rightward movement of the scene in the viewport 108 such that the scene in the viewport 108 may then include the out-of-view wall or other real-world objects to the right of the television 112b.

The virtual element 210 may be the same as or similar to the virtual element 110 of FIG. 1A. For example, the virtual element 210 may comprise a virtual remote control as seen in FIG. 1A, although any buttons and other features that may often be present on a remote control or other type of elongated object are not shown on the virtual element 210 for clarity of illustration. Aspects of FIGS. 2A-E are not necessarily shown to scale or may be visually exaggerated also for purposes of illustration. Although the virtual element 210, the viewport 208, and the device 102 are vertically elongated in this example, as well as in the examples of FIGS. 3A-E, 4A-E, and 5A-D, similar concepts may be applied to a horizontally elongated virtual element, a horizontally elongated viewport, and/or a horizontally elongated device.

FIG. 2A illustrates the device 102 (and the associated camera, e.g., the camera 106 in FIG. 1B, although not shown) at rest with the approximate middle (vertically) portion of the virtual element 210 shown in the viewport 208. The viewport 208 may comprise a focal point 220 at the viewport's 208 center (e.g., the center of the viewport 208 in both the vertical and horizontal dimensions of the viewport 208). The focal point 220 may correspond to the real-world space that is directly in front of the device's 102 camera. For example, an object shown in the viewport 208 at the focal point 220 may be the real-world object directly in front of the camera. Or put another way, a real-world object directly in front of the camera may be shown in the viewport 208 at the focal point 220 (or at least would be shown at the focal point 220 if the virtual element 210 happens to overlay said object in the viewport 208). The focal point 220 may remain at a constant position in the viewport 208 throughout the various steps shown in FIGS. 2A-E regardless of the movements of the device 102 and the virtual element 210 in the viewport 208. Although shown in the various figures of the instant application, the focal point 220 may be a hidden element or attribute of the viewport 208 rather than being visually represented in the viewport 208 in practice.

The virtual element 210 may comprise a longitudinal line segment 226 that runs along at least a portion of the longitudinal axis of the virtual element 210. The longitudinal line segment 226 may be centered with respect to the horizontal dimension of the virtual element 210. The longitudinal line segment 226 may run from the top of the virtual element 210 to the bottom of the virtual element 210. The entirety of the longitudinal line segment 226 may not be seen in FIG. 2A since only a portion of the virtual element 210 is shown in the viewport 208. In some aspects, the longitudinal line segment 226 may run over only a portion of the longitudinal axis of the virtual element 210. For example, the longitudinal line segment 226 may run to the top edge of the virtual element 210 but not to the bottom edge of the virtual element 210. Like the focal point 220, the longitudinal line segment 226 may not typically be shown in the viewport 208 in practice, as indicated by the dotted lines of the longitudinal line segment 226.

The virtual element 210 may comprise an offset focal point 222 that is variably positioned on the longitudinal line segment 226. The position of the offset focal point 222 may be the position on the longitudinal line segment 226 that is closest to the focal point 220 of the viewport 208. The position of the offset focal point 222 may be iteratively determined during movements of the device 102. Whether the virtual element 210 has moved or will move too far out of the viewport 208 (e.g., too far away from the focal point 220, whether vertically, horizontally, or a combination thereof) may be determined based on the relative positions of the focal point 220 and the offset focal point 222. For example, the virtual element 210 may be determined as being too far out of the viewport 208 based on a threshold distance d (shown in FIG. 2A) from the offset focal point 222. The threshold distance d may define the radius of a distance threshold circle 224 with the offset focal point 222 at its center. If the focal point 220 is outside of the distance threshold circle 224 (i.e., the distance between the focal point 220 and the offset focal point 222 exceeds the threshold distance d), the virtual element 210 may be judged as moving too far out of the viewport 208, in which case further movement of the virtual element 210 out of the viewport 208 may be limited or the virtual element 210 may be moved closer to the center of the viewport 208. Like the focal point 220 and the longitudinal line segment 226, the offset focal point 222 and the distance threshold circle 224 may not typically be shown in the viewport 208 in practice.

It is noted that the distance threshold circle 224 is used as a visual representation of the threshold distance d between the focal point 220 and the offset focal point 222. The distance threshold circle 224 may be alternatively defined with the focal point 220 at its center, with appropriate adjustments to the techniques described herein. The resultant movement or positioning of the virtual element may be the same regardless of whether the distance threshold circle 224 is defined with the offset focal point 222 at its center or with the focal point 220 at its center.

Continuing to FIG. 2B, the device 102 (e.g., the device's 102 camera and/or the scene in the viewport 208) is moved horizontally to the right in the real-world space, as indicated by the corresponding movement arrow. Based on the movement of the device 102, the virtual element 210 is moved horizontally to the left in the viewport 208, as also indicated by the corresponding movement arrow. As noted above, this may simulate or give the vision impression that the virtual element 210 is actually present in the real-world space. Here, the focal point 220 is still within the distance threshold circle 224 (i.e., the distance between the focal point 220 and the offset focal point 222 is less than the threshold distance d). The virtual element 210 may thus continue to move within the viewport 208 commensurate with the movement of the device 102.

In FIG. 2C, the device 102 has continued to move horizontally to the right in the real-world space and the virtual element 210 has moved horizontally to the left in the viewport 208 accordingly. Here, the focal point 220 is outside of the distance threshold circle 224 (i.e., the distance between the focal point 220 and the offset focal point 222 is greater than the threshold distance d). The movement or position of the virtual element 210 outside of the viewport 208 thus may be beyond acceptable limits. The positions of the virtual element 210 and the offset focal point 222 in FIG. 2C and other figures may be exaggerated for purposes of illustration, although not necessarily so. For example, the comparison between the respective positions of the focal point 220 and the offset focal point 222, as well as determining the position of the focal point 222 along the longitudinal line segment 226, may be done on a frame-by-frame basis of the viewport 208 output. Thus the movement of the virtual element 210 may be limited or corrected before the virtual element 210 reaches the position shown in FIG. 2C. Although it is also possible that the virtual element 210 moved that far between two frames. Additionally or alternatively, a predictive analysis may be performed to determine if an expected movement of the virtual element 210 will cause the focal point 220 to be outside of the distance threshold circle 224.

Having determined in relation to FIG. 2C that the virtual element 210 has moved too far to the left in the viewport 208, FIG. 2D shows a corrective rightward movement of the virtual element 210 in the viewport 208. The virtual element 210 may be moved to the right until the focal point 220 is, at the least, at or within the distance threshold circle 224.

In FIG. 2E, the device 102 is again moved (or continues to be moved) to the right in the real-world space. Had the focal point 220 not already been at the limit of the distance threshold circle 224, the virtual element 210 may move to the left in the viewport 208 accordingly. Yet because any further leftward movement of the virtual element 210 would bring the focal point 220 outside of the distance threshold circle 224, such movement of the virtual element 210 is restricted. The virtual element 210 may appear to a user as being pulled along with the further rightward movement of the device 102. The movements of the device 102 shown in FIGS. 2B-E may represent a single continuous movement of the device 102. Or the movement of the device 102 may cease at FIG. 2D and then begin again at FIG. 2E. In some aspects, the virtual element 210 may resettle towards the horizontal middle of the viewport 208 once the device 102 ceases movement.

In some aspects, the process of positioning the virtual element 210 within the viewport 208 may completely disallow movement of the virtual element 210 that would cause the focal point 220 to move outside of the distance threshold circle 224. Rather, when the focal point 220 reaches the distance threshold circle 224 or is predicted to be moved outside of the distance threshold circle 224, the movement of the virtual element 210 in that direction may be disallowed and the virtual element 210 may be pulled along with any further movement of the device 102 in the opposite direction. The same or similar concepts may apply to the virtual element movement controls described in relation to FIGS. 3A-E, 4A-E, and 5A-D and elsewhere in the instant application.

FIGS. 3A-E illustrate the device 102 as it undergoes various stages of vertical movement in the real-world space and any associated vertical movements of an elongated virtual element 310 in a viewport 308 output by the screen display of the device 102. FIGS. 3A-E also show a focal point 320 of the viewport 308 and an offset focal point 322 positioned on a longitudinal line segment 326 of the virtual element 310. A threshold distance d (shown in FIG. 3A) defines a distance threshold circle 324 with the offset focal point 322 at its center. The virtual element 310, the viewport 308, the focal point 320, the offset focal point 322, the longitudinal line segment 326, and the distance threshold circle 324 may be the same as or similar to, in at least some aspects, the virtual element 210, the viewport 208, the focal point 220, the offset focal point 222, the longitudinal line segment 226, and the distance threshold circle 224 of FIGS. 2A-E, respectively. Aspects of FIGS. 3A-E are not necessarily shown to scale or may be visually exaggerated for purposes of illustration.

Figure 3C:
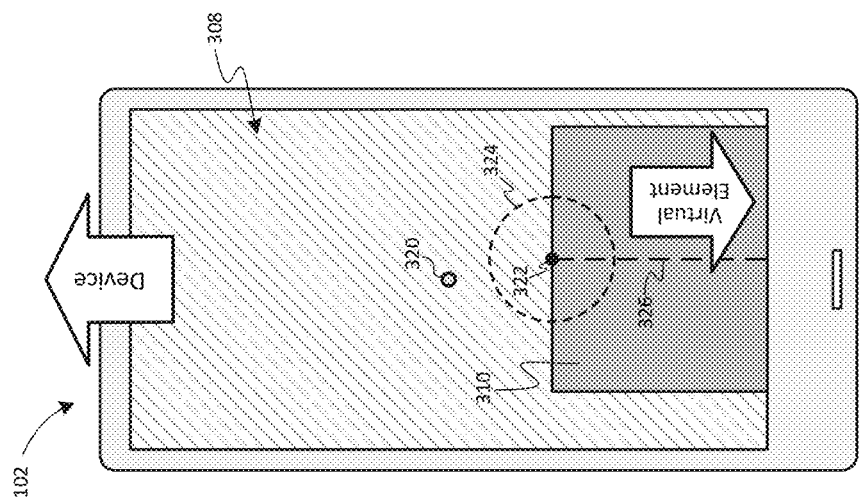
FIGS. 3A-E are diagrams of an example computing device under various stages of movement.
Figure 3B:
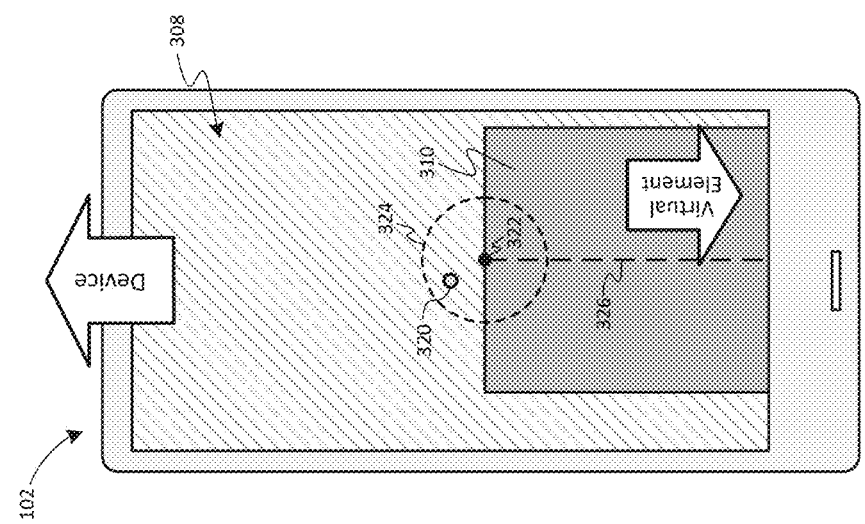
Figure 3A:
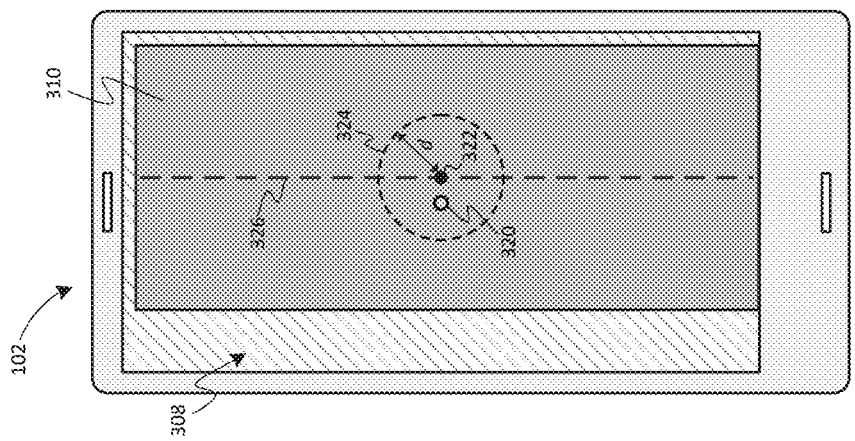

FIG. 3A shows the device 102 at rest in the real-world space. The top and middle portions of the virtual element 310 are within the viewport 308 while the bottom portion of the virtual element 310 is outside of the viewport 308. The position of the offset focal point 322 is within the distance threshold circle 324 (i.e., the distance between the focal point 320 and the offset focal point 322 is less than the threshold distance d), so the position of the virtual element 310 may be considered as within acceptable limits.

In FIG. 3B, the device 102 is moved upward in the real-world space while the virtual element 310 is moved downward in the viewport 308 accordingly. For example, a user may move the device 102 upward to more easily view features of the virtual element 310 at the top portion of the virtual element 310. Additionally or alternatively, the user may cause the top portion of the virtual element 310 to move toward the middle of the virtual element 310 to indicate that the user wishes to receive information relating to a feature (e.g., a remote control button) at the top portion of the virtual element 310.

Based on the movements of the device 102, a position of the offset focal point 322 along the longitudinal line segment 326 may be determined that is closest to the focal point 320. In this case, the position of the offset focal point 322 is at the topmost limit of the longitudinal line segment 326. The focal point 320 is within the distance threshold circle 324, as it is defined based on the determined position of the offset focal point 322. Thus the relative positions of the focal point 320 and the offset focal point 322 do not presently cause movement of the virtual element 310 to be restricted.

In FIG. 3C, the device 102 is moved further upward in the real-world space and the virtual element 310 is moved downward in the viewport 308 accordingly. A position of the offset focal point 322 along the longitudinal line segment 326 that is closest to the focal point 320 may be again determined. Like in FIG. 3B, said position of the offset focal point 322 is also at the topmost limit of the longitudinal line segment 326. Alternatively, it may not be required at this point to re-determine, per se, the position of the offset focal point 322 since the offset focal point 322 was already at its uppermost position on the longitudinal line segment 326 in FIG. 3B. Yet in contrast to FIG. 3B, the focal point 320 in FIG. 3C is outside of the distance threshold circle 324. The virtual element 310 may thus have moved downward beyond an acceptable limit, as it is defined by the threshold distance d. It is noted that this and other steps relating to FIGS. 3A-E may be performed in a predictive manner. For example, rather than determining that the virtual element 310 has already moved too far downward, it may be determined that a predicted movement of the virtual element 310 may cause the focal point 320 to be outside of the distance threshold circle 324 and the movement of the virtual element 310 may be controlled accordingly.

Figure 3D:
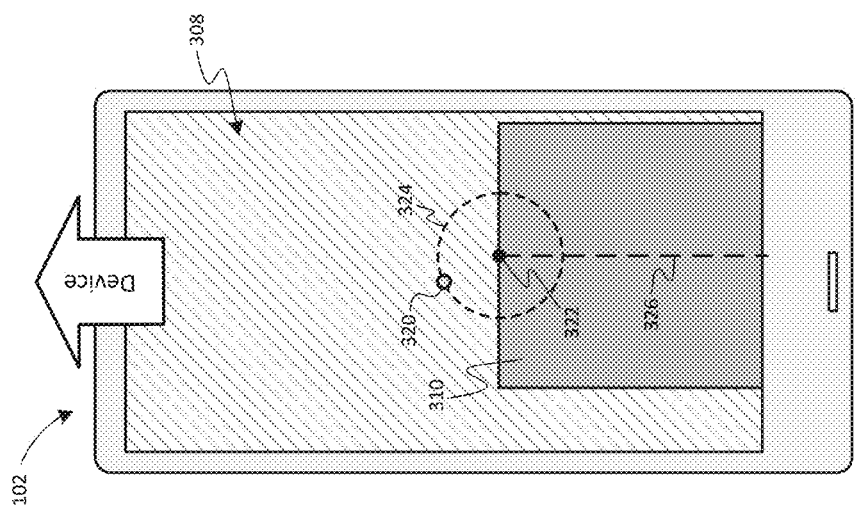

In FIG. 3D, the virtual element 310 may undergo corrective movement to cause the focal point 320 to be at or within the distance threshold circle 324. Here, the virtual element 310 is moved upward in the viewport 308 such that the focal point 320 is at the distance threshold circle 324. In this example, the position of the offset focal point 322 is at the same position along the longitudinal line segment 326 as in FIG. 3C, although this may not always be the case. For instance, the virtual element 310 may have also been caused to move horizontally and/or rotate in the viewport 308 and this may result in the position along the longitudinal line segment 326 that is closest to the focal point 322 being somewhere other than at the upper limit of the longitudinal line segment 326. In either case, the step(s) to perform the corrective movement of the virtual element 310 may include determining one or more updated positions of the offset focal point 322 as the virtual element 310 moves within the viewport 308.

In FIG. 3E, the device 102 is again (or continues to be) moved upward in the real-world space. Rather than moving the virtual element 310 downward in the viewport 308 based on the upward movement of the device 102, the downward movement of the virtual element 310 may be restricted because any further movement in that direction would cause the focal point 320 to move outside of the distance threshold circle 324. The virtual element 310 may appear to be pulled along with the device 102 as the device 102 continues to be moved upward in the real-world space.

FIGS. 4A-E illustrate the device 102 as it undergoes various stages of horizontal and vertical movement in the real-world space and any associated horizontal and vertical movements of an elongated virtual element 410 in a viewport 408 output by the screen display 104 of the device 102. FIGS. 4A-E also show a focal point 420 of the viewport 408 and an offset focal point 422 positioned on a longitudinal line segment 426 of the virtual element 410. A threshold distance d (shown in FIG. 4A) defines a distance threshold circle 424 with the offset focal point 422 at its center. The virtual element 410, the viewport 408, the focal point 420, the offset focal point 422, the longitudinal line segment 426, and the distance threshold circle 424 may be the same as or similar to, in at least some aspects, the virtual element 210, the viewport 208, the focal point 220, the offset focal point 222, the longitudinal line segment 226, and the distance threshold circle 224 of FIGS. 2A-E, respectively. Aspects of FIGS. 4A-E are not necessarily shown to scale or may be visually exaggerated for purposes of illustration.

Figure 4C:
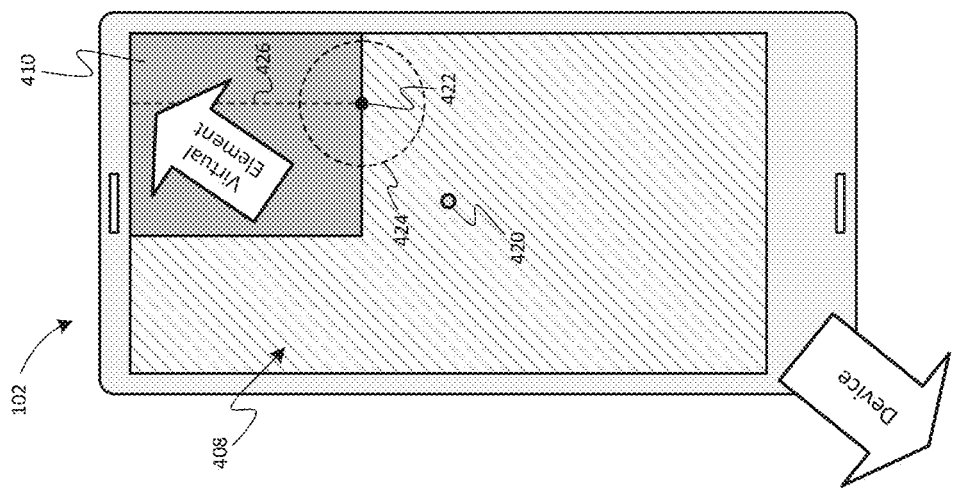
FIGS. 4A-E are diagrams of an example computing device under various stages of movement.
Figure 4B:
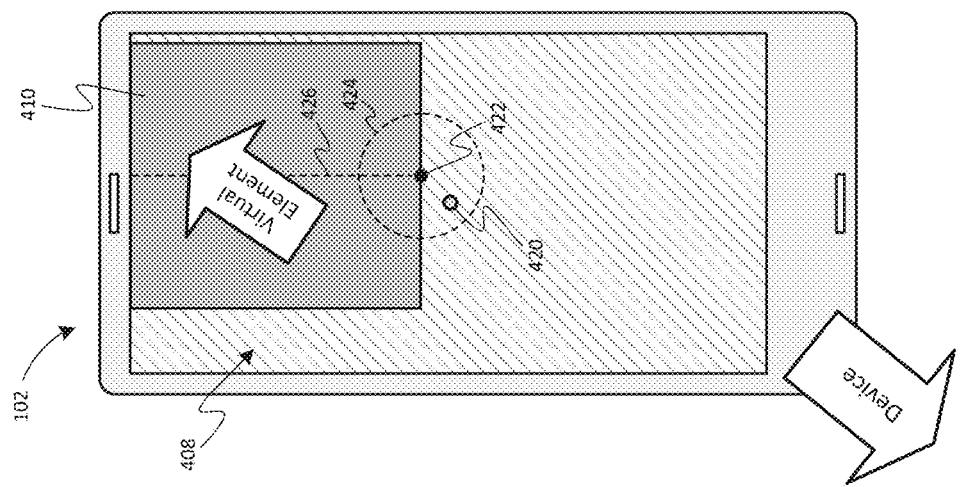
Figure 4A:
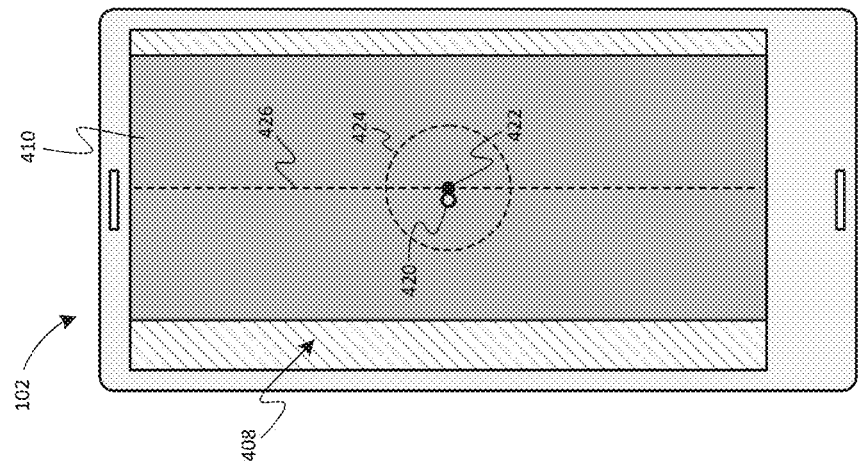

FIG. 4A shows the device 102 at rest in the real-world space. At least the approximate middle portion of the virtual element 410 is shown in the viewport 408. The topmost and the bottommost ends of the virtual element 410 are outside of the viewport 408. The offset focal point 422 is at the position on the longitudinal line segment 426 closest to the focal point 420 and the resultant distance threshold circle 424 encompasses the focal point 420.

In FIG. 4B, the device 102 is moved diagonally downward and to the left in the real-world space, as indicated by the corresponding movement arrow. Based on the movement of the device 102, the virtual element 410 is moved diagonally upward and to the right, as also indicated by the corresponding movement arrow. The user may have moved the device 102 in this manner to more easily view a feature (e.g., a button of a remote control) at the bottom portion of the virtual element 410 or to indicate that the user wishes to receive more information about this feature.

A position of the offset focal point 422 on the longitudinal line segment 426 may be determined based on the movements of the device 102 and virtual element 410 shown in FIG. 4B. In this case, the determined position of the offset focal point 422 is at the bottom limit of the longitudinal line segment 426 (i.e., at the bottom edge of the virtual element 410). With the position of the offset focal point 422 determined as such, the focal point 420 is within the distance threshold circle 424. That is, the distance between the offset focal point 422 and the focal point 420 does not exceed the threshold distance d. Accordingly, the position of the virtual element 410 with respect to the viewport 408 may be considered as within acceptable limits.

In FIG. 4C, the device 102 is moved further downward and to the left in the real-world space. Based on this movement of the device 102, the virtual element 410 is moved further upward and to the right in the viewport 408. A position of the offset focal point 422 along the longitudinal line segment 426 that is closest to the focal point 420 is again determined. Alternatively, it may not be required at this point to re-determine, per se, the position of the offset focal point 422 since the offset focal point 422 was already at its lowermost position on the longitudinal line segment 326 in FIG. 4B. Yet in contrast to FIG. 4B, the focal point 420 in FIG. 4C is outside of the distance threshold circle 424. That is, the distance between the offset focal point 422 and the focal point 420 exceeds the threshold distance d. The position of the virtual element 410 with respect to the viewport 408 may be deemed as exceeding acceptable limits.

Figure 4E:
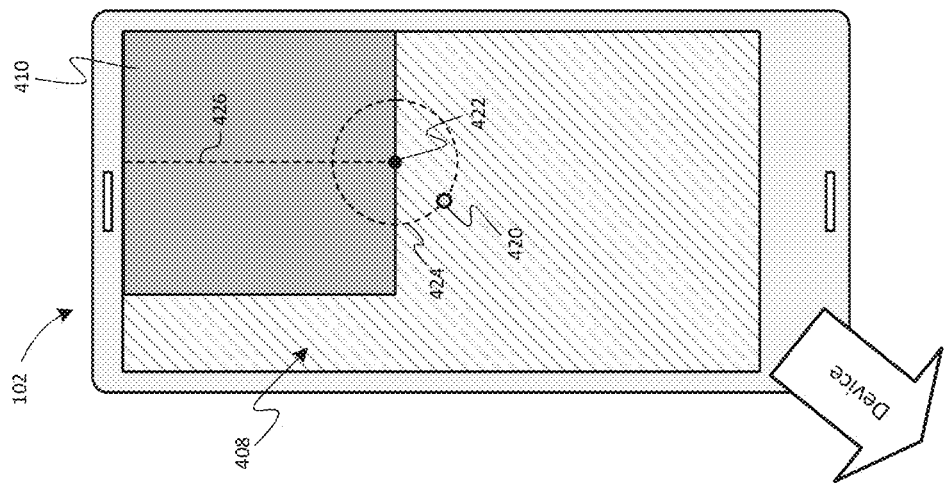
Figure 4D:
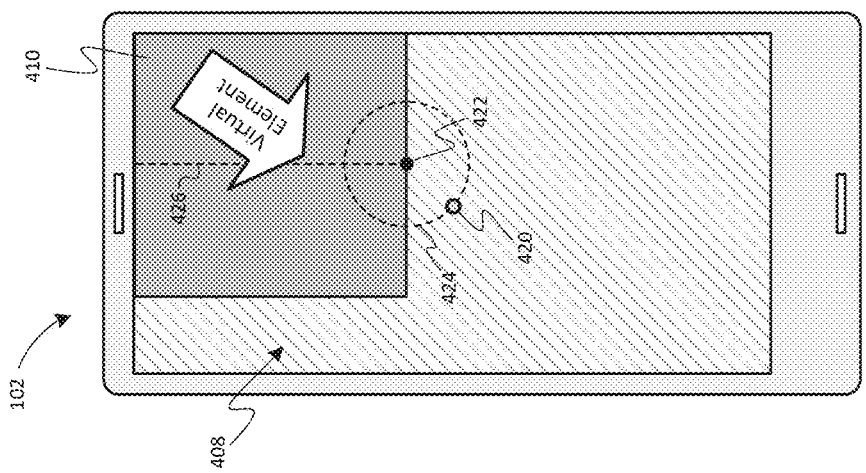

FIG. 4D illustrates a corrective movement of the virtual element 410 to bring its position relative to the viewport 408 within acceptable limits. In this case, the virtual element 410 is moved downward and to the left in the viewport 408. The corrective movement of the virtual element 410 may cause the focal point 420 to be at or within the distance threshold circle 424. The corrective movement of the virtual element 410 may be based on the position of the offset focal point 422 along the longitudinal line segment 426. Such position of the offset focal point 422 may be determined one or more times (e.g., multiple times) over the course of the corrective movement of the virtual element 410 from the position shown in FIG. 4C to the position shown in FIG. 4D.

FIG. 4E illustrates a further movement (or a continuation of the movement shown in FIGS. 4B-C) of the device 102 diagonally downward and to the left in the real-world space. Since the focal point 420 is already at the limit of the distance threshold circle 424, a corresponding diagonal movement of the virtual element 410 upward and to the right in the viewport 408 may be restricted rather than allowing further movements of the virtual element 410 in that direction.

FIGS. 5A-D illustrate the device 102 as it undergoes various stages of movements towards or away from the user in the real-world space and any associated movements of an elongated virtual element 510 in a viewport 508 output by the screen display 104 of the device 102. FIGS. 5A-D also show a focal point 520 of the viewport 508 and an offset focal point 522 positioned on a longitudinal line segment 526 of the virtual element 510. A threshold distance d (shown in FIG. 5A) defines a distance threshold circle 524 with the offset focal point 522 at its center. The virtual element 510, the viewport 508, the focal point 520, the offset focal point 522, the longitudinal line segment 526, and the distance threshold circle 524 may be the same as or similar to, in at least some aspects, the virtual element 210, the viewport 208, the focal point 220, the offset focal point 222, the longitudinal line segment 226, and the distance threshold circle 224 of FIGS. 2A-E, respectively. Aspects of FIGS. 5A-D are not necessarily shown to scale or may be visually exaggerated for purposes of illustration.

Figure 5B:
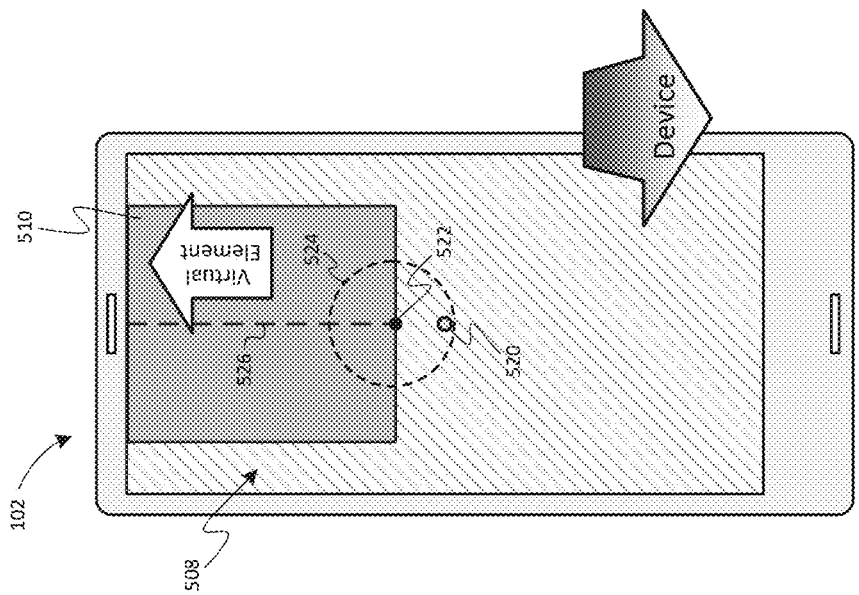
FIGS. 5A-D are diagrams of an example computing device under various stages of movement.
Figure 5A:
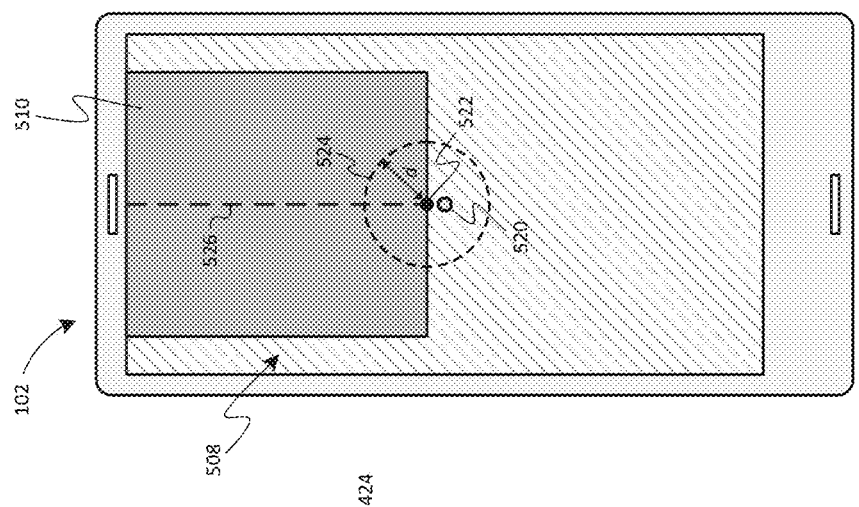

FIG. 5A shows the device 102 at rest in the real-world space. A bottom portion of the virtual element 510 is visible in the viewport 508, while an approximate middle portion and a top portion of the virtual element 510 are outside of the viewport 508. The position of the offset focal point 522 is at the lowermost limit of the longitudinal line segment 526 (i.e., the bottom edge of the virtual element 510) and the focal point 520 is within the distance threshold circle 524.

In FIG. 5B, the device 102 is moved toward the user in the real-world space, as indicated by the corresponding movement arrow. Such movement of the device 102 in the real-world space may be similar to what one would do if he or she wishes to zoom out from an object, as the object would be seen in the viewport 508. If the right/left movements of the device 102 may be considered movements along an X axis and the upward/downward movements of the device 102 may be considered movements along a Y axis, the movements of the device 102 toward or away from the user may be considered movements along a Z axis. Based on the movement of the device 102 toward the user, the virtual element 510 may be shown as if having been zoomed out. As such, the virtual element 510 may shrink in its proportions, effectively causing the bottom edge of the virtual element 510 to move upward in the viewport 508. The zoom-out movement of the device 102 represented in FIG. 5B may not trigger corrective movement or movement restrictions for the virtual element 510 since the focal point 520 is within the distance threshold circle 524. In some aspects, a movement of the device 102 away from the user, rather than toward the user, may cause the zoomed-out appearance of the virtual element 510 in the viewport 508, but the same concepts may apply with appropriate adjustments.

Figure 5D:
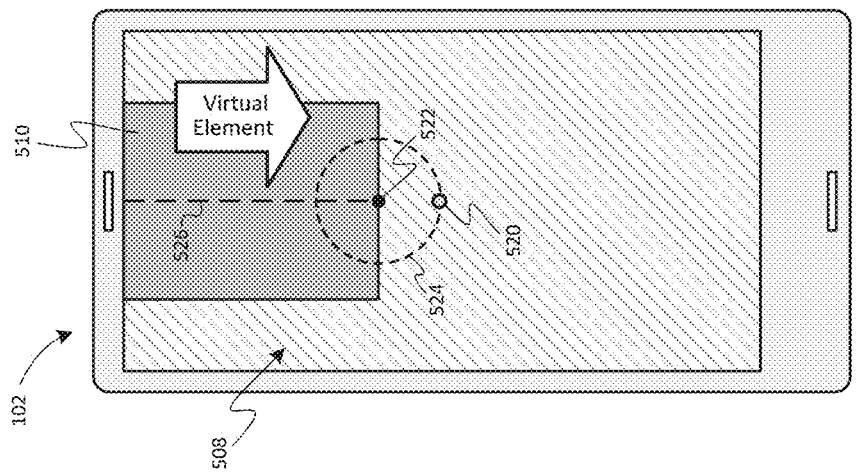
Figure 5C:
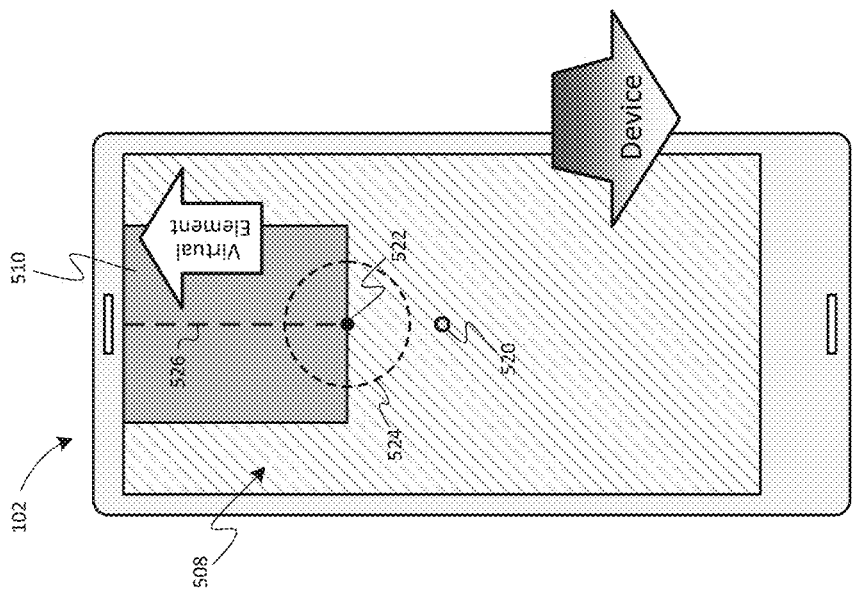

In FIG. 5C, the device 102 is further moved toward the user in the real-world space, thus causing the virtual element 510 to further shrink in its proportions in the viewport 508, which, in effect, also causes the bottom edge of the virtual element 510 to shift upward. As a result, the focal point 520 of the viewport 508 is outside of the distance threshold circle 524, as it is defined with the determined offset focal point 522 positioned at the bottom-most limit of the longitudinal line segment 526.

In FIG. 5D, a corrective movement of the virtual element 510 is implemented to shift the virtual element 510 downward, as indicated by the movement arrow. The downward movement of the virtual element 510 may cause the focal point 520 to be at or within the distance threshold circle 524. In the example shown in FIG. 5D, the proportions of the virtual element 510 are held constant between FIGS. 5C and 5D. Additionally or alternatively, the proportions of the virtual element 510 may be adjusted (e.g., zoomed in) to cause the focal point 520 to be at or within the distance threshold circle 524.

Figure 6:
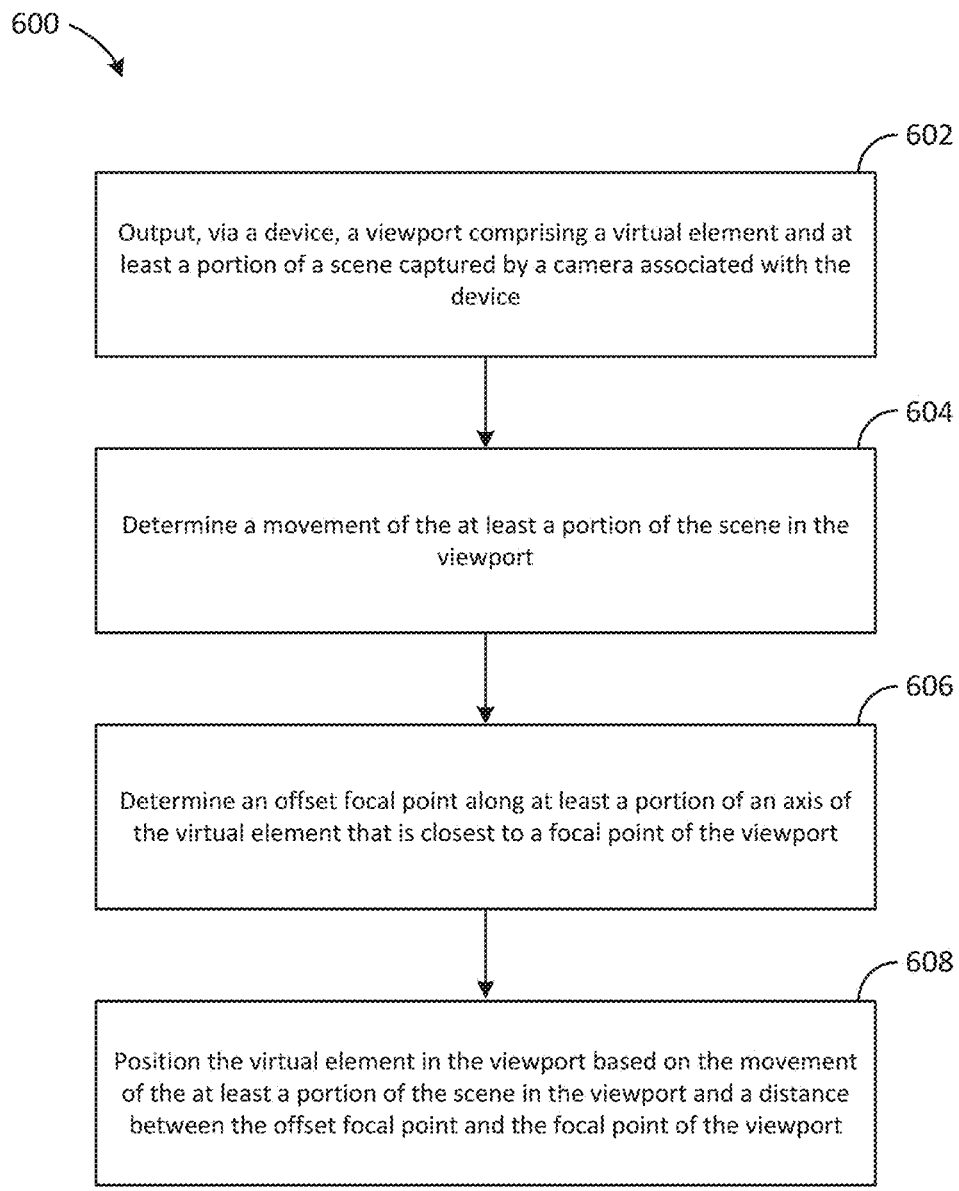
FIG. 6 is a flow diagram of an example method.

FIG. 6 illustrates a flow diagram of a method 600 for movement control of a virtual element in a viewport output by a device (a computing device, e.g., the device 102 of FIGS. 1A-B). The viewport may comprise an augmented reality (AR) viewport and the virtual element may be elongated. The virtual element may move in the viewport based on movement of a scene (e.g., a scene captured by a camera associated with the device) in the viewport. Such movement of the virtual element in the viewport may replicate a user experience as if the object represented by the virtual element did in fact exist in the real-world space, for example. Although, under certain conditions, movement of the virtual element in the viewport may be restricted or corrected for. For example, movement of the virtual element may be restricted if the position of the virtual element (or portion thereof) with respect to the viewport is or will be outside of acceptable limits. The method 600 may allow for less restrictive movement or positioning of the virtual element in the directions corresponding to the virtual element's elongated dimension than in the directions corresponding to the virtual element's non-elongated dimension.

The virtual element may comprise the virtual element 110 of FIG. 1A, such as a virtual remote control. The virtual element may additionally or alternatively comprise one or more of the virtual elements 210, 310, 410, 510 of FIGS. 2A-E, FIGS. 3A-E, FIGS. 4A-E, and FIGS. 5A-D, respectively. The viewport may likewise comprise one or more of the viewports 108, 208, 308, 408, 508 of FIGS. 1A-B, FIGS. 2A-E, FIGS. 3A-E, FIGS. 4A-E, and FIGS. 5A-D, respectively. The virtual element may be elongated in a generally vertical dimension of the viewport, as shown in the figures, or the virtual element may be elongated in a generally horizontal dimension of the viewport.

At step 602, the viewport may be output (e.g., caused to be output) on a screen display of the device. As noted, the viewport may comprise the virtual element, as well as at least a portion of a scene captured by the camera associated with the device. The virtual element may overlay at least a portion of the scene in the viewport. The virtual element may be movable in the viewport, including movement that takes a portion of the virtual element outside of the viewport. The movement of the virtual element in the viewport may be based on movement of the at least a portion of the scene in the viewport. Additionally or alternatively, the movement of the virtual element in the viewport may be based on movement of the device, movement of the camera, movement of the viewport, data from a gyroscope of the device, data from an accelerator of the device, and/or data from a movement sensor of the device. For example, as shown in FIG. 2B, a horizontal movement (e.g., to the right) of the at least a portion of the scene in the viewport may cause an opposite horizontal movement (e.g., to the left) of the virtual element in the viewport. As another example, as shown in FIG. 3B, a vertical movement (e.g., upward) of the at least a portion of the scene in the viewport may cause an opposite vertical movement (e.g., downward) of the virtual element in the viewport. As another example, as shown in FIG. 4B, a diagonal movement (e.g., a combined movement to the left and downward) of the at least a portion of the scene in the viewport may cause an opposite diagonal movement (e.g., a combined movement to the right and upward) of the virtual element in the viewport. As another example, as shown in FIG. 5B, a zoom-in or zoom-out movement of the at least a portion of the scene in the viewport may cause the virtual element to shrink or expand in the viewport. The zoom-in or zoom-out movement of the at least a portion of the scene in the viewport may be caused by a movement of the device and/or camera toward or away from a user (e.g., a Z axis movement).

At step 604, a movement of the at least a portion of the scene in the viewport may be determined. Determining the movement of the at least a portion of the scene in the viewport may be based on at least one of: a movement of the camera, a movement of the device, a movement of the viewport, data from a gyroscope of the device, data from an accelerometer of the device, or data from a movement sensor of the device. The movement may be horizontal, vertical, diagonal, zoom-in, zoom-out, or any combination thereof.

At step 606, an offset focal point along at least a portion of the virtual element's axis may be determined. The axis may be a longitudinal axis of the virtual element. The offset focal point may be the point along the at least a portion of the longitudinal axis that is closest to a focal point of the viewport (i.e., a viewport focal point). The offset focal point may comprise the offset focal point 222, 322, 422, 522 of FIGS. 2A-E, FIGS. 3A-E, FIGS. 4A-E, and FIGS. 5A-D, respectively. The offset focal point may be determined based on the movement of the at least a portion of the scene in the viewport. For example, the offset focal point may be determined following a movement of the at least a portion of the scene in the viewport, including a completed movement of the at least a portion of the scene in the viewport or a movement that is part of an ongoing movement of the at least a portion of the scene in the viewport. The offset focal point may be a predicted offset focal point that is determined based on the movement or a predicated movement of the at least a portion of the scene in the viewport. Additionally or alternatively, the offset focal point or a predicted offset focal point may be determined based on a movement or a predicted movement, respectively, of the device and/or the camera.

The focal point of the viewport may be at the vertical and horizontal center of the viewport. The focal point may correspond to the real-world space that is directly in front of the camera. The focal point may comprise the focal point 220, 320, 420, 520 of FIGS. 2A-E, FIGS. 3A-E, FIGS. 4A-E, and FIGS. 5A-D, respectively. The offset focal point may be determined and/or re-determined one or more times before, during, or after a movement of the device, whereas the position of the focal point within the viewport may remain constant regardless of the movement of the at least a portion of the scene in the viewport (and/or the movement of the device and/or the movement of the camera).

The longitudinal axis may be parallel to the elongated dimension of the virtual element and at the middle point in the non-elongated dimension of the virtual element. The at least a portion of the longitudinal axis may comprise a longitudinal line segment, such as the longitudinal line segment 226, 326, 426, 526 of FIGS. 2A-E, FIGS. 3A-E, FIGS. 4A-E, and FIGS. 5A-D, respectively. The longitudinal line segment may span the entire longitudinal axis of the virtual element (e.g., from the top edge to the bottom edge of a vertically elongated virtual element) or only a portion of the longitudinal axis. FIGS. 3A-B provide examples in which the offset focal point 322 is at the top edge of the virtual element 310 along the longitudinal line segment 326.

At step 608, the virtual element may be positioned in the viewport based on the movement of the at least a portion of the scene in the viewport and a distance between the offset focal point and the focal point of the viewport. Additionally or alternatively, the virtual element may be positioned in the viewport based on the movement of the camera and/or device and a distance between the offset focal point and the focal point of the viewport. Positioning the virtual element in the viewport may comprise moving the virtual element in the viewport. The virtual element may be positioned in the viewport based on a distance threshold. For example, the distance between the offset focal point and the focal point may be compared to the distance threshold.

If the distance between the offset focal point and the focal point is less than or equal to (e.g., satisfies) the distance threshold, the position and/or movement of the virtual element in the viewport may correspond to the movement of the at least a portion of the scene in the viewport without additional limitations. FIG. 3B shows an example in which the movement of the virtual element 310 corresponds to the movement of the device 102 (e.g., the movement of the at least a portion of the scene in the viewport) and is at that moment unrestricted by the distance between the offset focal point 322 and the focal point 320 because the focal point 320 is within the distance threshold circle 324 (i.e., said distance is less than or equal to the threshold distance d). FIGS. 2B, 4B, and 5B provide similar examples associated with horizontal movement, diagonal movement, and toward/away movement of the device 102 (e.g., horizontal movement, diagonal movement, and zoom-in/zoom-out movement of the at least a portion of the scene in the viewport), respectively.

Yet if the distance between the offset focal point and the focal point of the viewport is greater than (e.g., does not satisfy) the distance threshold, the positioning and/or movement of the virtual element may be restricted and/or subject to correction. For example, the virtual element may be instead moved (or not moved, as the case may be) in the viewport so that the distance between the offset focal point of the virtual element and the focal point of the viewport is less than or equal to the distance threshold. This may include preventing a movement of the virtual element that would cause the distance between the offset focal point and the focal point of the viewport to exceed the distance threshold. In this case, the virtual element may appear to be pulled along with the movement of the camera and/or the at least a portion of the scene in the viewport rather than moving further out of the viewport. Additionally or alternatively, the virtual element may be subject to corrective movement, such as if the virtual element was already too far out of the viewport. In this case, the virtual element may be moved so that the distance between the offset focal point and the focal point of the viewport is equal to or less than the distance threshold. Here, the virtual element may be seen as catching up to the camera and/or the at least a portion of the scene in the viewport.

Figure 3E:
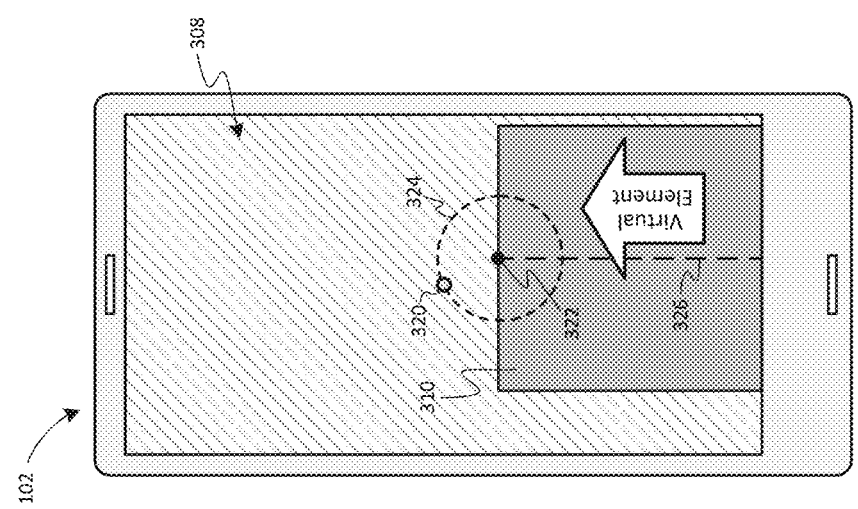

FIGS. 3C-E show an example in which the positioning and/or movement of the virtual element 310 that results (or would result) from the indicated movement of the device 102 (e.g., movement of the at least a portion of the scene in the viewport 308) is restricted and/or corrected because the focal point 320 in FIG. 3C is outside of the distance threshold circle 324 (i.e., said distance is greater than the threshold distance d). In FIG. 3D, the virtual element 310 is subject to corrective upward movement in the viewport 308 that causes the focal point 320 to be at the distance threshold circle 324. In other words, the virtual element 310 in FIG. 3C is determined to be too far out of the viewport 308. The virtual element 310 is moved upward in FIG. 3D so that the position of the virtual element 310 in relation to the viewport 308 is within acceptable limits. In FIG. 3E, the device 102 is moved further in the indicated direction that initially caused the virtual element 310 to move or about to be moved out of the viewport 308. Here, the downward movement of the virtual element 310 that would otherwise occur based on the upward movement of the device 102 is prevented so that the focal point 320 remains at the distance threshold circle 324. The virtual element 310 may appear to be pulled along with the device 102 as the device 102 is pulled upward. FIGS. 2C-E, 4C-E, and 5C-D provide similar examples associated with horizontal movement, diagonal movement, and toward/away movement of the device 102, respectively.

Figure 7:
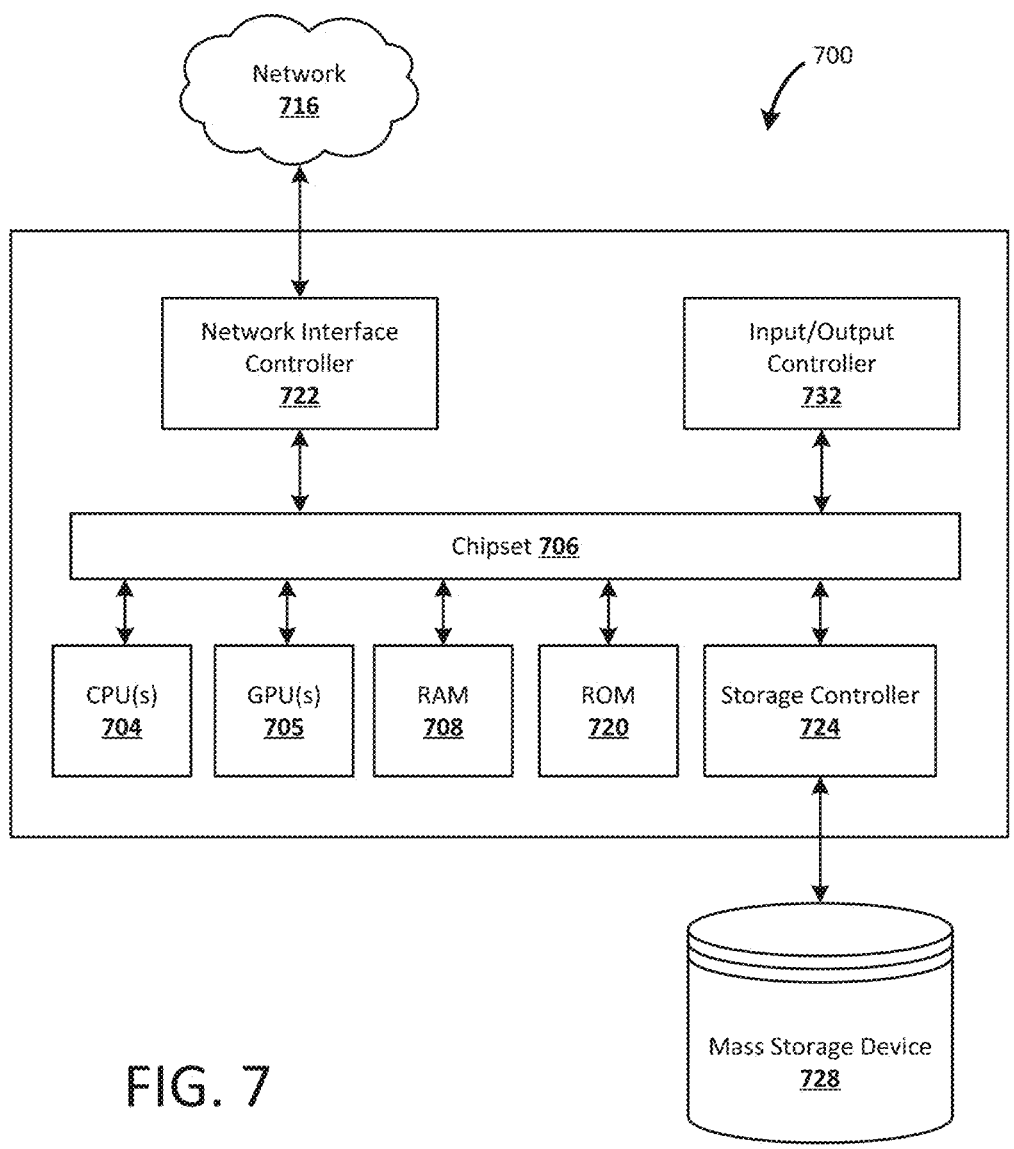
FIG. 7 is a block diagram of an example computing device.

FIG. 7 depicts a computing device in which the systems, methods, and devices disclosed herein, or all or some aspects thereof, may be embodied. For example, components such as the device 102 of FIGS. 1A-B may be implemented generally in a computing device, such as the computing device 700 of FIG. 7. The computing device of FIG. 7 may be all or part of a server, workstation, desktop computer, laptop, tablet, network appliance, PDA, e-reader, digital cellular phone, set top box, or the like, and may be utilized to implement any of the aspects of the systems, methods, and devices described herein.

The computing device 700 may include a baseboard, or "motherboard," which is a printed circuit board to which a multitude of components or devices may be connected by way of a system bus or other electrical communication paths. One or more central processing units (CPUs) 704 may operate in conjunction with a chipset 706. The CPU(s) 704 may be standard programmable processors that perform arithmetic and logical operations necessary for the operation of the computing device 700.

The CPU(s) 704 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 704 may be augmented with or replaced by other processing units, such as GPU(s) 705. The GPU(s) 705 may comprise processing units specialized for but not necessarily limited to highly parallel computations, such as graphics and other visualization-related processing.

A chipset 706 may provide an interface between the CPU(s) 704 and the remainder of the components and devices on the baseboard. The chipset 706 may provide an interface to a random access memory (RAM) 708 used as the main memory in the computing device 700. The chipset 706 may further provide an interface to a computer-readable storage medium, such as a read-only memory (ROM) 720 or non-volatile RAM (NVRAM) (not shown), for storing basic routines that may help to start up the computing device 700 and to transfer information between the various components and devices. ROM 720 or NVRAM may also store other software components necessary for the operation of the computing device 700 in accordance with the aspects described herein.

The computing device 700 may operate in a networked environment using logical connections to remote computing nodes and computer systems through local area network (LAN) 716. The chipset 706 may include functionality for providing network connectivity through a network interface controller (NIC) 722, such as a gigabit Ethernet adapter. A NIC 722 may be capable of connecting the computing device 700 to other computing nodes over a network 716. It should be appreciated that multiple NICs 722 may be present in the computing device 700, connecting the computing device to other types of networks and remote computer systems.

The computing device 700 may be connected to a mass storage device 728 that provides non-volatile storage for the computer. The mass storage device 728 may store system programs, application programs, other program modules, and data, which have been described in greater detail herein. The mass storage device 728 may be connected to the computing device 700 through a storage controller 724 connected to the chipset 706. The mass storage device 728 may consist of one or more physical storage units. A storage controller 724 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 700 may store data on a mass storage device 728 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 728 is characterized as primary or secondary storage and the like.

For example, the computing device 700 may store information to the mass storage device 728 by issuing instructions through a storage controller 724 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 700 may further read information from the mass storage device 728 by detecting the physical states or characteristics of one or more particular locations within the physical storage units.

In addition to the mass storage device 728 described above, the computing device 700 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 700.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 728 depicted in FIG. 7, may store an operating system utilized to control the operation of the computing device 700. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 728 may store other system or application programs and data utilized by the computing device 700.

The mass storage device 728 or other computer-readable storage media may also be encoded with computer-executable instructions, which, when loaded into the computing device 700, transforms the computing device from a general-purpose computing system into a special-purpose computer capable of implementing the aspects described herein. These computer-executable instructions transform the computing device 700 by specifying how the CPU(s) 704 transition between states, as described above. The computing device 700 may have access to computer-readable storage media storing computer-executable instructions, which, when executed by the computing device 700, may perform the methods described herein.

A computing device, such as the computing device 700 depicted in FIG. 7, may also include an input/output controller 732 for receiving and processing input from a number of input devices, such as a keyboard, a mouse, a touchpad, a touch screen, an electronic stylus, or other type of input device. Similarly, an input/output controller 732 may provide output to a display, such as a computer monitor, a flat-panel display, a digital projector, a printer, a plotter, or other type of output device. It will be appreciated that the computing device 700 may not include all of the components shown in FIG. 7, may include other components that are not explicitly shown in FIG. 7, or may utilize an architecture completely different than that shown in FIG. 7.

As described herein, a computing device may be a physical computing device, such as the computing device 700 of FIG. 7. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the systems, methods, and devices are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described systems, methods, and devices. When combinations, subsets, interactions, groups, etc., of these components are described, it is understood that while specific references to each of the various individual and collective combinations and permutations of these may not be explicitly described, each is specifically contemplated and described herein, for all systems, methods, and devices. This applies to all aspects of this application including, but not limited to, operations in described methods. Thus, if there are a variety of additional operations that may be performed it is understood that each of these additional operations may be performed with any specific embodiment or combination of embodiments of the described methods.

As will be appreciated by one skilled in the art, the systems, methods, and devices may take the form of an entirely hardware embodiment, an entirely software embodiment, or an embodiment combining software and hardware aspects. Furthermore, the systems, methods, and devices may take the form of a computer program product on a computer-readable storage medium having computer-readable program instructions (e.g., computer software) embodied in the storage medium. More particularly, the present systems, methods, and devices may take the form of web-implemented computer software. Any suitable computer-readable storage medium may be utilized including hard disks, CD-ROMs, optical storage devices, or magnetic storage devices.

Embodiments of the systems, methods, and devices are described above with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the systems, methods, and devices have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A method comprising:
causing, by a computing device, output of a viewport comprising a virtual element and at least a portion of a scene captured by a camera associated with the computing device;
determining a movement of the at least a portion of the scene in the viewport;
determining an offset focal point along at least a portion of an axis of the virtual element that is closest to a viewport focal point at a vertical and horizontal center of the viewport; and
positioning, based at least on the movement of the at least a portion of the scene in the viewport and a distance between the offset focal point and the viewport focal point, the virtual element in the viewport.

2. The method of claim 1, wherein the virtual element comprises a virtual remote control.

3. The method of claim 1, further comprising:
comparing the distance between the offset focal point and the viewport focal point to a distance threshold, wherein the positioning the virtual element in the viewport is based on the comparing the distance between the offset focal point and the viewport focal point to the distance threshold.

4. The method of claim 3, further comprising:
determining that the distance between the offset focal point and the viewport focal point exceeds the distance threshold; and
positioning the virtual element in the viewport such that the distance between the offset focal point and the viewport focal point is less than or equal to the distance threshold.

5. The method of claim 3, further comprising:
determining that the distance between the offset focal point and the viewport focal point is less than or equal to the distance threshold; and
positioning the virtual element in the viewport such that the distance between the offset focal point and the viewport focal point remains less than or equal to the distance threshold.

6. The method of claim 3, further comprising:
determining that the distance between the offset focal point and the viewport focal point is less than or equal to the distance threshold; and
maintaining the positioning of the virtual element in the viewport during the movement of the at least a portion of the scene in the viewport.

7. The method of claim 1, wherein the movement of the at least a portion of the scene in the viewport causes an opposite movement of the virtual element in the viewport.

8. The method of claim 1, wherein the movement of the at least a portion of the scene in the viewport comprises a predicted movement of the at least a portion of the scene in the viewport and the offset focal point comprises a predicted offset focal point based on the predicted movement of the at least a portion of the scene in the viewport.

9. The method of claim 1, wherein the virtual element is at least one of vertically elongated or horizontally elongated.

10. The method of claim 1, wherein the determining the movement of the at least a portion of the scene in the viewport is based on at least one of: a movement of the camera, a movement of the computing device, a movement of the viewport, data from a gyroscope of the computing device, data from an accelerometer of the computing device, or data from a movement sensor of the computing device.

11. The method of claim 1, wherein the axis of the virtual element comprises a longitudinal axis of the virtual element.

12. The method of claim 1, wherein the viewport comprises an augmented reality (AR) viewport.

13. The method of claim 1, further comprising:
indicating, by a user and based on the positioning the virtual element in the viewport, a feature of the virtual element.

14. The method of claim 1, wherein the computing device comprises at least one of a mobile device, a smart phone, a tablet computer, a portable gaming device, a wearable computing device, a head-mounted display, smart glasses, a virtual retinal display, or a contact lens configured to display computer-generated elements.

15. A device comprising:
one or more processors;
a camera; and
memory storing instructions that, when executed by the one or more processors, cause:
causing output of a viewport comprising a virtual element and at least a portion of a scene captured by the camera;
determining a movement of the at least a portion of the scene in the viewport;
determining an offset focal point along at least a portion of an axis of the virtual element that is the closest to a viewport focal point at a vertical and horizontal center of the viewport; and
positioning, based on the movement of the at least a portion of the scene in the viewport and a distance between the offset focal point and the viewport focal point, the virtual element in the viewport.

16. The device of claim 15, wherein the instructions, when executed by the one or more processors, further cause:
comparing the distance between the offset focal point and the viewport focal point to a distance threshold, wherein the positioning the virtual element in the viewport is based on the comparing the distance between the offset focal point and the viewport focal point to the distance threshold.

17. The device of claim 16, wherein the instructions, when executed by the one or more processors, further cause:
determining that the distance between the offset focal point and the viewport focal point exceeds the distance threshold; and
positioning the virtual element in the viewport such that the distance between the offset focal point and the viewport focal point is less than or equal to the distance threshold.

18. The device of claim 16, wherein the instructions, when executed by the one or more processors, further cause:
   determining that the distance between the offset focal point and the viewport focal point is less than or equal to the distance threshold; and
   positioning the virtual element in the viewport such that the distance between the offset focal point and the viewport focal point remains less than or equal to the distance threshold.

19. The device of claim 16, wherein the instructions, when executed by the one or more processors, further cause:
   determining that the distance between the offset focal point and the viewport focal point is less than or equal to the distance threshold; and
   maintaining the positioning of the virtual element in the viewport during the movement of the at least a portion of the scene in the viewport.

20. A non-transitory computer-readable medium comprising instructions that, when executed by one or more processors, cause:
   causing output of, by a computing device, a viewport comprising a virtual element and at least a portion of a scene captured by a camera associated with the computing device;
   determining a movement of the at least a portion of the scene in the viewport;
   determining an offset focal point along at least a portion of an axis of the virtual element that is the closest to a viewport focal point at a vertical and horizontal center of the viewport; and
   positioning, based on the movement of the at least a portion of the scene in the viewport and a distance between the offset focal point and the viewport focal point, the virtual element in the viewport.

21. The non-transitory computer-readable medium of claim 20, wherein the instructions, when executed by the one or more processors, further cause:
   comparing the distance between the offset focal point and the viewport focal point to a distance threshold, wherein the positioning the virtual element in the viewport is based on the comparing the distance between the offset focal point and the viewport focal point to the distance threshold.

22. The non-transitory computer-readable medium of claim 21, wherein the instructions, when executed by the one or more processors, further cause:
   determining that the distance between the offset focal point and the viewport focal point exceeds the distance threshold; and
   positioning the virtual element in the viewport such that the distance between the offset focal point and the viewport focal point is less than or equal to the distance threshold.

23. The non-transitory computer-readable medium of claim 21, wherein the instructions, when executed by the one or more processors, further cause:
   determining that the distance between the offset focal point and the viewport focal point is less than or equal to the distance threshold; and
   at least one of:
      positioning the virtual element in the viewport such that the distance between the offset focal point and the viewport focal point remains less than or equal to the distance threshold, or
      maintaining the positioning of the virtual element in the viewport during the movement of the at least a portion of the scene in the viewport.

* * * * *